US010123647B1

(12) United States Patent
Mustafa (10) Patent No.: US 10,123,647 B1
(45) Date of Patent: Nov. 13, 2018

(54) APPARATUS TO ADJUSTABLY AND REMOVABLY ATTACH A PAIR OF CURTAIN ROD RETAINERS TO THE HEAD RAIL OF A WINDOW BLIND AND TO ADJUST FOR DIFFERENT HEIGHTS OF A HEAD RAIL

(71) Applicant: Na'im Mustafa, Valley Village, CA (US)

(72) Inventor: Na'im Mustafa, Valley Village, CA (US)

( * ) Notice: Subject to any disclaimer, the term of this patent is extended or adjusted under 35 U.S.C. 154(b) by 0 days.

(21) Appl. No.: 15/490,037

(22) Filed: Apr. 18, 2017

(51) Int. Cl.
| A47B 96/06 | (2006.01) |
| A47H 1/142 | (2006.01) |
| A47H 1/122 | (2006.01) |
| F16B 2/12 | (2006.01) |
| F16M 13/02 | (2006.01) |

(52) U.S. Cl.
CPC ............ *A47H 1/142* (2013.01); *A47H 1/122* (2013.01); *F16B 2/12* (2013.01); *F16M 13/022* (2013.01)

(58) Field of Classification Search
CPC ........ A47H 1/122; A47H 1/142; A47H 1/102; F16B 2/12; F16M 13/022
USPC ....... 248/251, 252, 254, 255, 261, 262, 265, 248/215; 160/89, 368.1
See application file for complete search history.

(56) References Cited

U.S. PATENT DOCUMENTS

| 1,095,551 | A | | 5/1914 | Collier | |
| 2,386,854 | A | | 10/1945 | Hilton | |
| 2,738,154 | A | | 3/1956 | Mason | |
| 2,902,243 | A | * | 9/1959 | Atwood | A47H 1/122 248/263 |
| 4,322,050 | A | * | 3/1982 | Roach | A47H 1/122 248/222.51 |
| 4,684,095 | A | | 8/1987 | Athey | |
| 7,134,470 | B2 | | 11/2006 | McCance | |
| 7,198,088 | B2 | | 4/2007 | McMenamin | |
| 7,322,552 | B1 | * | 1/2008 | Lin | A47H 1/122 160/89 |
| 7,370,839 | B2 | * | 5/2008 | Putman | A47H 1/102 248/251 |
| 9,609,974 | B2 | * | 4/2017 | Mateer | A47H 1/102 |
| 2007/0257172 | A1 | | 11/2007 | Kelly | |

* cited by examiner

*Primary Examiner* — Todd M Epps
(74) *Attorney, Agent, or Firm* — Thomas I. Rozsa (57) ABSTRACT

A curtain rod bracket attachment member formed in two main sections which are slidably attached to each other. A first main section having an elongated section extending at one end to a first transverse retaining wall which is oriented perpendicular to the elongated section. A curtain rod retaining member extends at an opposite end of the elongated section to a curtain rod retaining section into which a curtain rod is placed and retained. A second main section includes a second transverse retaining wall and is slidably affixed to the elongated section of the main section to enable a distance between parallel first and second transverse retaining walls to be modified.

20 Claims, 7 Drawing Sheets

APPARATUS TO ADJUSTABLY AND REMOVABLY ATTACH A PAIR OF CURTAIN ROD RETAINERS TO THE HEAD RAIL OF A WINDOW BLIND AND TO ADJUST FOR DIFFERENT HEIGHTS OF A HEAD RAIL

BACKGROUND OF THE INVENTION

1. Field of the Invention

The present invention relates to the field of interior decorating and in particular to hanging curtains over an area in front of a window which curtains are visible from an interior of the room in which the window is located to increase the interior beauty of a room and/or at a location adjacent a window to provide an attractive appearance when the window is view from a location exterior to the room in which the window is located.

2. Description of the Prior Art

The following nine patents and published patent application are closest prior art known to the inventor:
1. U.S. Pat. No. 1,095,551 issued to Skinner A. Collier on May 5, 1914 for "Combination Shade and Curtain Bracket" (hereafter the "Collier Patent");
2. U.S. Pat. No. 2,386,854 issued to William Hilton on Oct. 16, 1945 for "Curtain Bracket" (thereafter the "Hilton Patent");
3, U.S. Pat. No. 2,738,154 issued to Homer R. Mason on Mar. 13, 1966 for "Hanger" (hereafter the "Mason Patent");
4. U.S. Pat. No. 32,902,243 issued to Harold T. Atwood on Sep. 1, 1959 for "Rod Support Structure" (hereafter the "Atwood Patent");
5. U.S. Pat. No. 4,684,095 issued to Wilber J. Athey on Aug. 4, 1987 for "Curtain Rod and Window Shade Holder" (hereafter the "Athey Patent");
6. U.S. Pat. No. 7,134,470 issued to Patrick McCance on Nov. 14, 2008 for "Window Covering Support Device and Method of Use Thereof" (hereafter the "McCance Patent");
7. U.S. Pat. No. 7,198,088 issued to Tim McMenamin et al on Apr. 3, 2007 for "Blind/Curtain Mounting Bracket For Rods" (hereafter the "McMenamin Patent");
8. United States Published Patent Application No. 2007/0252172 to David A. Kelly on Nov. 8, 2007 for "Mounting System and Bracket for Window Treatment" (hereafter the "Kelly Published Patent Application");
9. U.S. Pat. No. 7,322,552 issued to Wen-Jui Lin on Jan. 29, 2008 for "Curtain Rod Support" (hereafter the "Lin Patent").

The Collier Patent discloses a two piece device which hangs over the window blind bracket and then has a mechanism for inserting the curtain rod support portion wherein the curtain rod can be hung over it. The device disclosed in this patent does not have a mechanism to tighten the device to the window blind bracket, which does not have any feature to accommodate different depths of a window blind brackets and any mechanism to prevent movement of the curtain rod.

The Hilton Patent discloses a one piece device which hangs over the window blind bracket and then has a mechanism for inserting the curtain rod support portion wherein the curtain rod can be hung over it. The device disclosed in this patent does not have a mechanism to tighten the device to the window blind bracket, which does not have any feature to accommodate different depths of a window blind brackets and any mechanism to prevent movement of the curtain rod.

The Mason Patent is a complex mechanism referred to as a hanger to facilitate hanging if items including venetian blinds and curtains.

The Atwood Patent discloses a multi-component device to support the bracket for supporting venetian blinds other window covering hanging members.

The Athey Patent discloses a device which hangs over the window frame and has a portion which receives a thin curtain rod. The device disclosed in this patent does not have a mechanism to tighten the device to the window blind bracket, which does not have any feature to accommodate different depths of a window blind brackets and any mechanism to prevent movement of the curtain rod.

The McCance Patent discloses a fixed curtain rod supported by fixed brackets.

The McMenamin involving a complex bracket mounting system. discloses a mounting bracket for curtain rods The Kelly Published Patent Application discloses a mounting system and bracket for window treatments.

The Lin Patent discloses a curtain rod hanging device which requires affixation into a structure such as a wall.

In or about February, 2017, after the present inventor had already developed the invention that is the subject of this patent application, and has started offering for sale products embodying the present invention, a patent attorney forwarded to counsel for the present inventor a document that is allegedly a copy of U.S. patent application Ser. No. 15/269,857, an unpublished patent application (hereafter the "'857 Unpublished Application") claiming that the '857 Unpublished Application discloses and claims an invention that is prior art to the present invention.

SUMMARY OF THE INVENTION

The present invention is an apparatus which is a curtain rod bracket attachment member formed in two main sections which are expandably attached to each other through an expandable washer and a mating fastening member. The curtain rod bracket attachment member includes a first main section having an elongated section extending in a first flat or horizontal direction to a first distal end, a portion of the first main section referred to as a first longitudinal retaining member or first longitudinal retaining wall which is oriented in a flat or horizontal direction and terminates in a first distal end. The portion of the elongated longitudinal section between the first longitudinal retaining wall and the first curved portion described below is referred to as the elongated proximal section.

The elongated section extends at its opposite second end to a curtain rod retaining section which by way of example in a preferred embodiment, a first curved portion which extends to a first transverse portion or first transverse wall having an exterior surface and an interior surface which extends to a second curved portion which extends to a semi-circular section having an exterior surface and an interior surface which extends to a third curved portion which extends to a second transverse portion or second transverse wall having an exterior surface and an interior surface ending in an upper arcuate top portion having an exterior surface and an interior surface.

Described more broadly the curtain rod retaining section is extending to a first curved portion which extends to a first transverse wall having at least an interior surface which extends to a semi-circular wall having at least an interior surface which extends to a second transverse wall having an exterior surface and an interior surface partially surrounding an interior chamber having an opening, The first curved portion, the first transverse wall, the second curved portion, the semi-circular section, the third curved portion and the second transverse wall and the upper arcuate top portion are one integral unit forming a curtain rod retaining section. The curtain rod retaining section includes a partially open interior channel with a semi-circular bottom and spaced apart first and second transverse walls with an opening between the first curved portion and the interior surface of the upper arcuate top portion, extending to the bottom semi-circular section, an elongated portion of a curtain rod is inserted through the opening and rests on the semi-circular section and between the first and second transverse walls.

A curtain rod retaining member extends through a location between the second transverse wall and the upper arcuate top portion from exterior to interior surface and comprises a threaded opening between the in second transverse wall and upper arcuate top portion (or only the second transverse wall) aligned with the first curved portion with a mating threaded bolt (more broadly described as a mating fastening member) extending through the threaded opening, an interior end of the threaded bolt extending into the partially open interior channel and an exterior end of the threaded bolt ending in a flat circular knob (more broadly described as a curtain rod retaining member).

The elongated section further includes an opening (an unthreaded opening is preferred but it is also within the spirit and scope of the present invention for the opening to be a threaded opening) in the longitudinal proximal section extending from an upper surface of the longitudinal proximal section to the lower surface of the longitudinal proximal section. It is within the spirit and scope of the present invention for the opening to not be threaded. The curtain rod attachment member includes a second main section having a first short elongated portion extending to a fourth curved portion at one end extending to a third transverse member or third transverse wall which is oriented perpendicular to the first short elongated section. The third transverse wall extends to a fifth curved portion at its end remote from the fourth curved portion. The fifth curved portion extends to a second longitudinal retaining member or second longitudinal retaining wall which is aligned parallel to and spaced apart from the first longitudinal retaining wall, and terminating in a second distal end. The first end of the first longitudinal retaining member is aligned with the second distal end of the second longitudinal retaining member. Described more broadly, a second main section has a first short elongated section extending to a first end of a transverse wall which is oriented perpendicular to the first short elongated section, the transverse wall extending at a second end to a second longitudinal retaining wall which is aligned parallel to and spaced apart from the first longitudinal retaining wall, the second longitudinal retaining wall having at least an upper interior surface and terminating in a second distal end.

The first short elongated section has a second threaded opening extending from top surface to its bottom surface. The first short elongated section is aligned parallel to the longitudinal proximal section of the elongated section of the first main section The first threaded opening in the longitudinal proximal section is aligned with the second threaded opening (or unthreaded opening) in the first short elongated section. A mating threaded bolt is threaded through the first threaded opening (or extended through an unthreaded opening), through a central opening in a flexible expandable washer and through the second threaded opening (or fastening opening).

In operation, the distance between the first longitudinal retaining wall and the second longitudinal retaining wall is modified/adjusted by loosening the short threaded bolt and inserting the curtain rod bracket attachment member over a head rail of a window blind (or other window shade or covering) so that the lower surface of the first longitudinal retaining member rests on the upper surface of a portion of a top of the head rail and the upper surface of the second longitudinal retaining member rests against the lower surface of a bottom portion of a head real and the threaded bolt is tightened to form a press fit retention to provide a height adjustment means to accommodate head rails of varying vertical heights. For shorter height head rails, the washer is compressed or even removed. For taller height head rails, the washer expands, and at least one flexible expandable washer (or a multiplicity of washers with central openings stacked on top of each other) is used and inserted between the lower surface of the elongated proximal section and the upper surface of the short longitudinal section. The curtain rod retaining section projects in front of the head rail or behind the back of the head rail.

Two such curtain rod attachment members are fastened at spaced apart locations on the head rail. A curtain rod is inserted into parallel curtain rod retaining sections and the knob of the curtain rod retaining member causes the threaded bolt to be fastened against a portion of the curtain rod to prevent the curtain rod from sliding on the curtain rod attachment members.

The object of the present invention is to provide at least a pair of spaced apart curtain rod attachment members which are parallel to each other and adjustable to conform to the height from top surface to bottom surface of a head rail of vertical venetian blinds or other vertical window shades or horizontal venetian shades or other horizontal window shades without requiring any structural modification to the head rail of any other portion of a wall of a room.

It is a further object of the present invention to provide at least a pair of spaced apart curtain attachment rod members which are removably attached to the head rail.

Additional objects of the present invention include inside mounted blind curtain rod bracket attachments which: (1) being specially engineered for blind attachment; (2) inside mounted vertical rail blind attachments; (3) adjustable to fit between one (1) inch and one and a half (1½) inch height of head rails; (4) adjustable to fit vertical or mini blinds; (5) no brackets to screw in the wall; (6) no drilling; (7) no hammering; and (9) fits up to one (1) inch diameter curtain rod.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
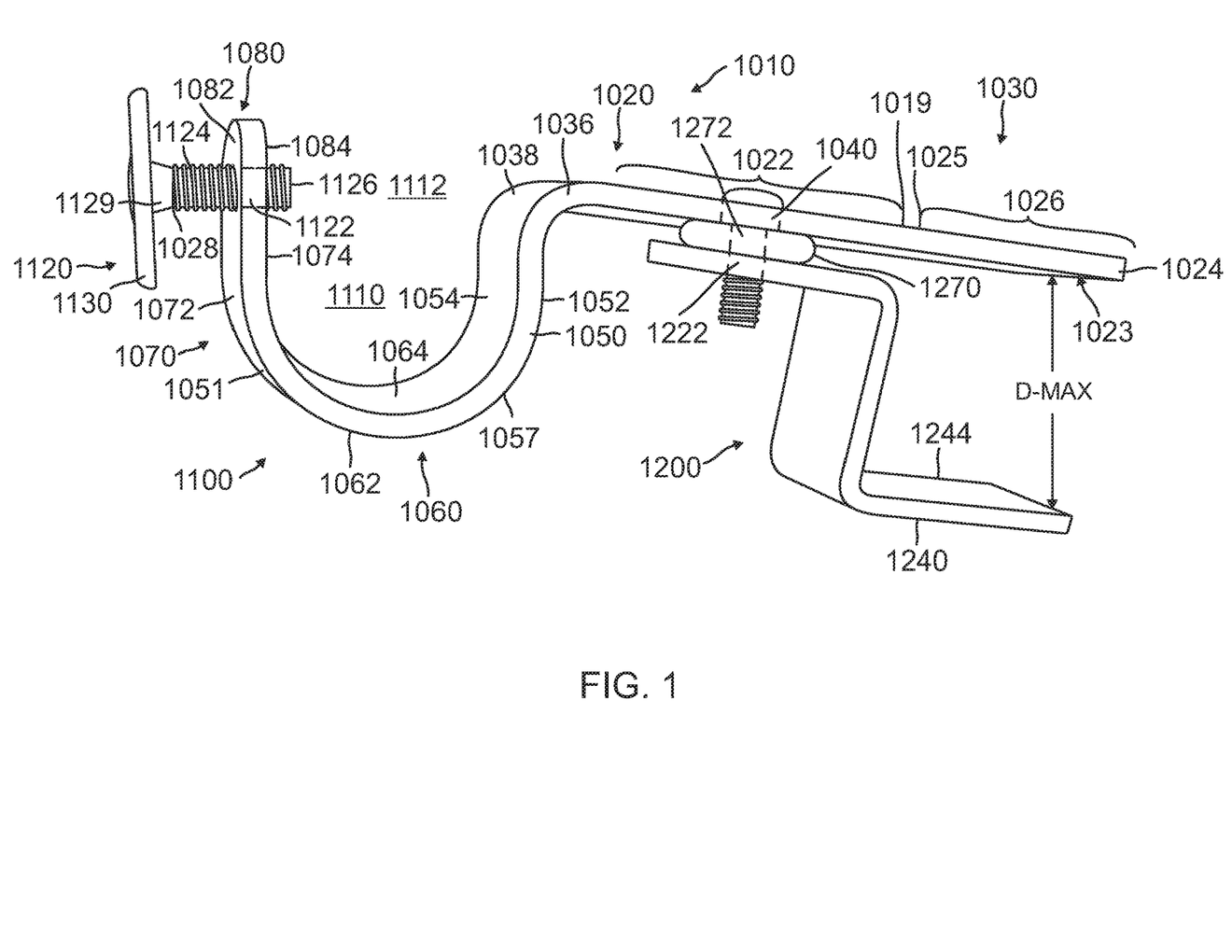
FIG. 1 is a top-left side perspective view of the present invention curtain rod bracket attachment member, illustrating the second longitudinal retaining wall at a first distance from the first longitudinal retaining wall and the washer in an uncompressed state.
Figure 2:
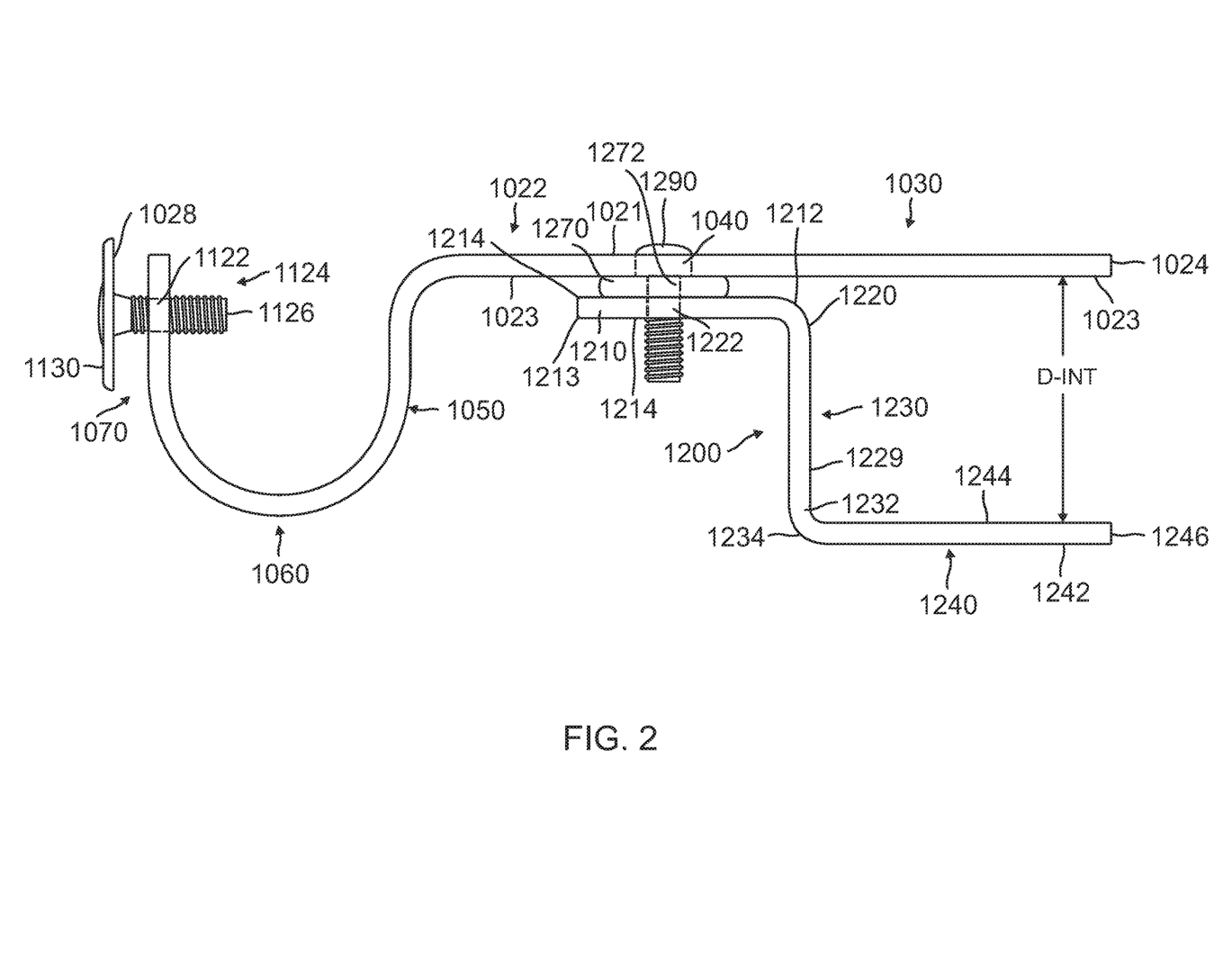
FIG. 2 is a left side elevational perspective view of the present invention curtain rod bracket attachment member, illustrating the second longitudinal retaining wall at a shorter distance from the first longitudinal retaining wall than illustrated in FIG. 1, and the washer compressed.
Figure 3:
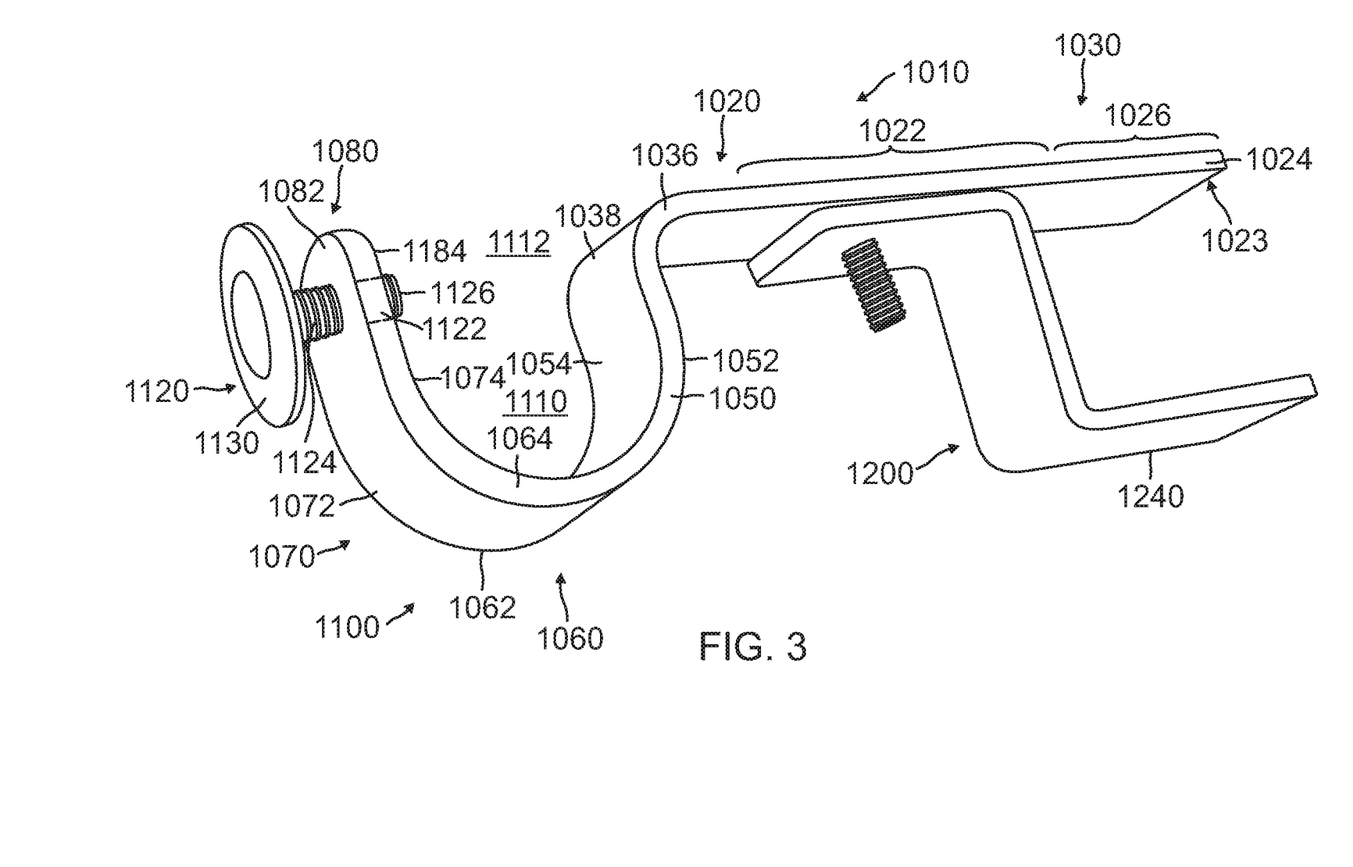
FIG. 3 is a top-left side perspective view of the present invention curtain rod bracket attachment member, illustrating the second longitudinal retaining wall at a shortest distance from the first longitudinal retaining wall and the washer removed.
Figure 4:
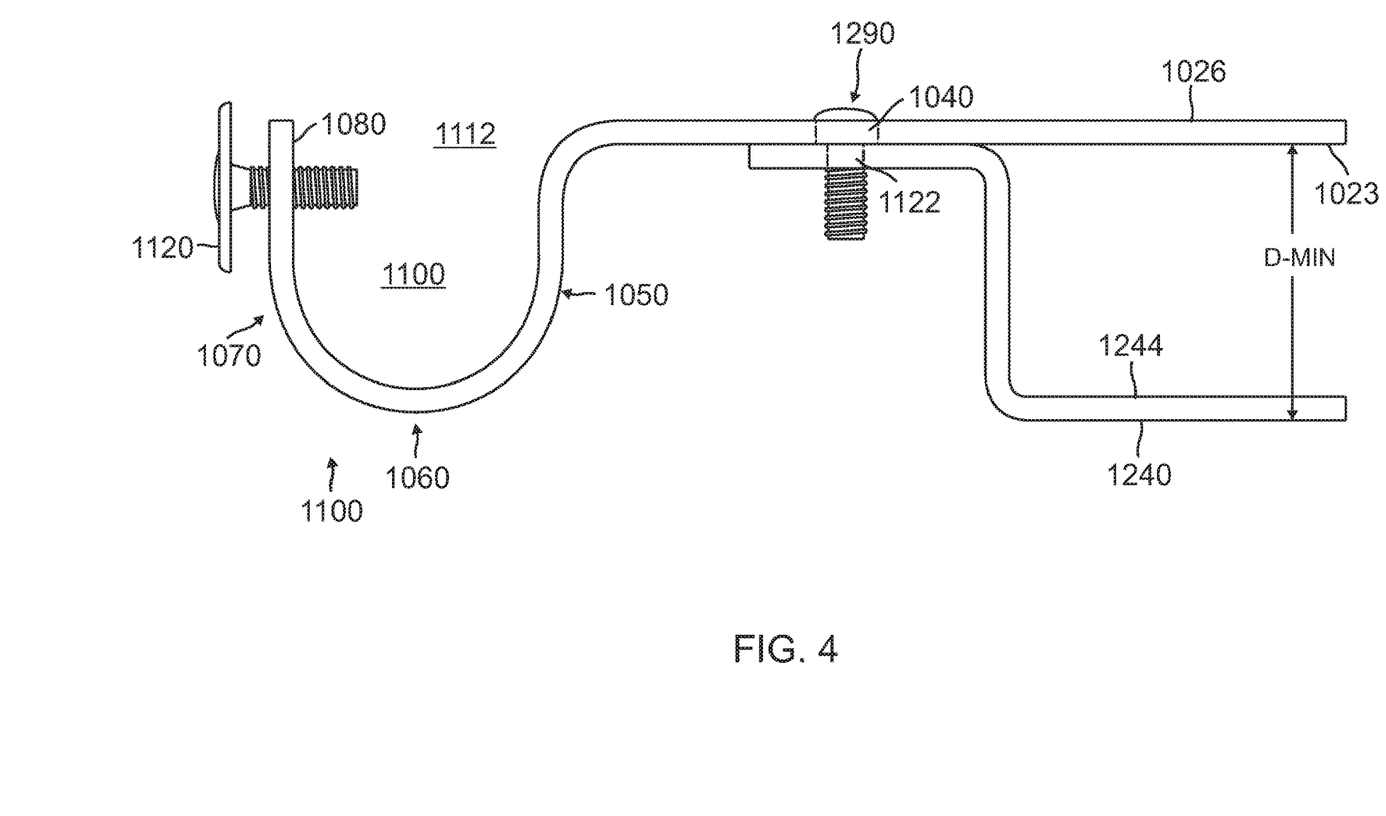
FIG. 4 is a-left side perspective view of the present invention curtain rod bracket attachment member, illustrating the second longitudinal retaining wall at a shortest distance from the first longitudinal retaining wall and the washer removed.
Figure 5:
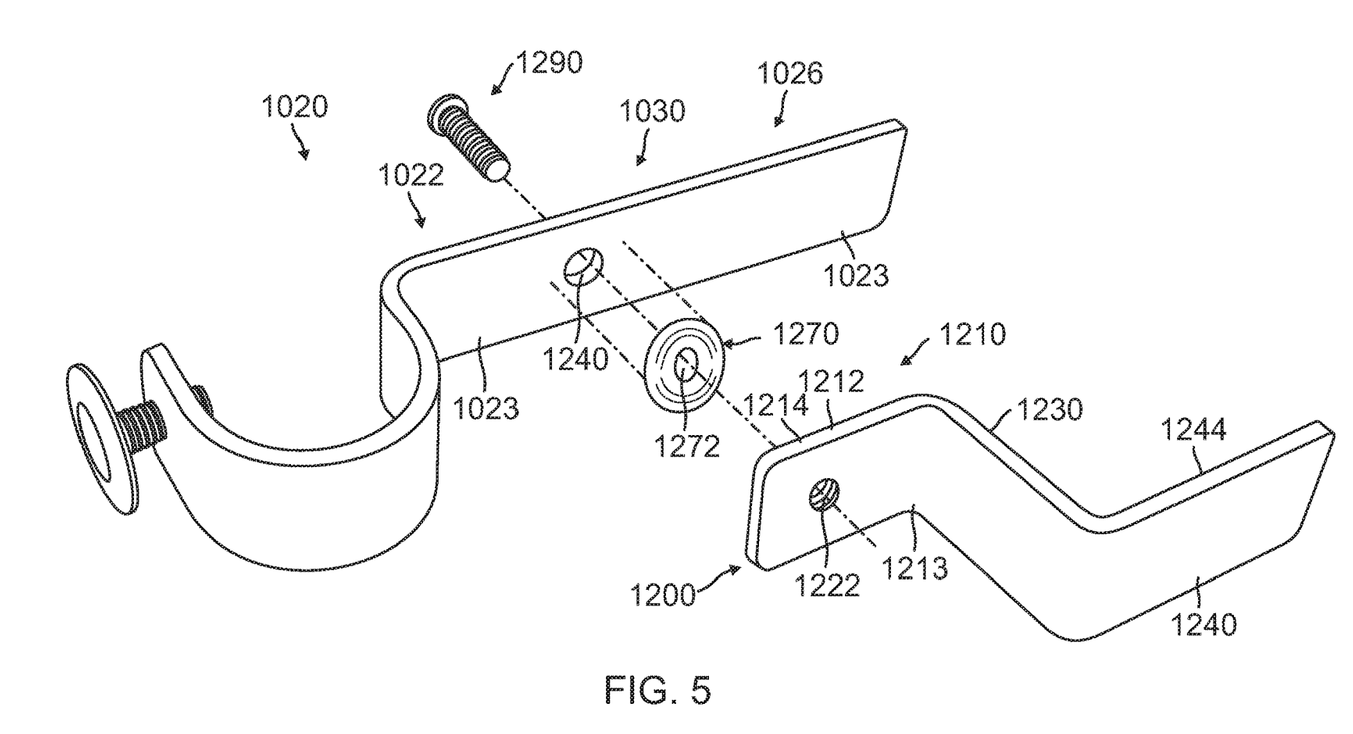
FIG. 5 is a bottom perspective exploded view of the present invention curtain rod bracket attachment member, illustrating the first main section of the present invention curtain rod bracket attachment, the second main section of the present invention curtain rod bracket attachment, the mating threaded bolt and the washer.

FIG. 1 is a top-left side perspective view of the present invention curtain rod bracket attachment member, illustrating the second longitudinal retaining wall at a first distance from the first longitudinal retaining wall and the washer in an uncompressed state. FIG. 2 is a left side elevational perspective view of the present invention curtain rod bracket attachment member, illustrating the second longitudinal retaining wall at a shorter distance from the first longitudinal retaining wall than illustrated in FIG. 1, and the washer compressed. FIG. 3 is a top-left side perspective view of the present invention curtain rod bracket attachment member, illustrating the second longitudinal retaining wall at a shortest distance from the first longitudinal retaining wall and the washer removed. FIG. 4 is a left side perspective view of the present invention curtain rod bracket attachment member, illustrating the second longitudinal retaining wall at a shortest distance from the first longitudinal retaining wall and the washer removed. FIG. 5 is a bottom perspective exploded view of the present invention curtain rod bracket attachment member, illustrating the first main section of the present invention curtain rod bracket attachment, the second main section of the present invention curtain rod bracket attachment, the mating threaded bolt and the washer.

The present invention is an apparatus which is a curtain rod bracket attachment member formed in two main sections which are vertically movably attached to each other. Referring to FIGS. 1, 2, 3, 4 and 5, there is illustrated the curtain rod bracket attachment member 1010 which includes a first main section 1020 having an elongated section 1030 extending in a first flat or horizontal direction to a first distal end 1024, a portion of the first main section referred to as a first longitudinal retaining member or first longitudinal retaining wall 1026 which is oriented in a flat or horizontal direction and terminates in the first distal end 1024. The portion of the elongated longitudinal section between the first longitudinal retaining wall 1026 and the first curved portion described below is referred to as the elongated proximal section 1022. The proximal end 1025 of the first longitudinal retaining wall 1026 is integrally formed with the distal end 1021 of the elongated proximal section 1022.

The elongated section 1030 extends at its opposite second end or proximal end 1036 to a first curved portion 1038 which extends to a first transverse portion or first transverse wall 1050 having an exterior surface 1052 and an interior surface 1054 which extends to a semi-circular wall 1060 (or a second curved section 1057 between them) having an exterior surface 1062 and an interior surface 1064 which extends to a second transverse portion or second transverse wall 1070 (or a third curved section 1051 between them) having an exterior surface 1072 and an interior surface 1074 ending in an upper arcuate top portion or upper arcuate top wall 1080 having an exterior surface 1082 and an interior surface 1084.

The first curved portion 1038, the first transverse wall 1050, (and second curved section 1057) the semi-circular wall 1060, (the third curved portion 1051), the second transverse wall 1070 and the upper arcuate top wall 1080 (optional) are one integral unit forming a curtain rod retaining section 1100. Described more broadly, the curved sections 1057 and 1051 are eliminated and therefore, the curtain rod retaining section 1100 comprises the first transverse wall 1050, the semi-circular section 1060 and the second transverse wall 1070 which extends into the area sometimes defined as upper arcuate top 1080 In addition, in the later portion of the text where curved portions are identified as fourth and fifth, if the curved portions second and third are not used, then what is described as fourth and fifth curved sections are instead second and third curved sections. The curtain rod retaining section 1100 includes a partially open interior channel 1110 with the interior surface 1064 of a semi-circular wall 1060 and spaced apart interior surface 1054 of first transverse wall 1050 and interior surface 1074 of second transverse wall 1070 with an opening 1112 between the first curved portion 1038 and the interior surface 1084 of the upper arcuate top wall 1380 extending to the bottom semi-circular wall 1060, an elongated portion of a curtain rod (discussed later on in this patent application) is inserted through the opening and rests on the interior surface 1064 of semi-circular wall 1060 and between the interior surface 1054 of first transverse wall 1050 and interior surface 1074 of second transverse wall 1070.

A curtain rod retaining member 1120 extends through a location between the second transverse wall 1070 and the upper arcuate top wall 1080 (or only through the second transverse wall 1070) from respective exterior surfaces 1072 and 1082 to respective interior surfaces 1074 and 1084 and comprises a threaded opening 1122 within the second transverse wall 1070 and upper arcuate top wall 1080 aligned with the first curved portion 1038 with a threaded bolt 1124 (or fastening member) extending through threaded opening 1122, an interior end 1126 of the threaded bolt 1124 extending into the partially open interior channel 1110 and an exterior end 1128 of the threaded bolt 1124 ending in a flat circular knob 1130 (or collar 1129 of flat curtain rod 1130).

The elongated section 1030 further includes an opening 1040 in the longitudinal proximal section 1022 extending from an upper surface 1021 of the longitudinal proximal section 1022 to the lower surface 1023 of the longitudinal proximal section 1022. The curtain rod attachment member 1010 includes a second main section 1200 having a first short elongated section 1210 extending to a fourth curved portion 1220 at one end 1212 extending to a third transverse member or third transverse wall 1230 which is oriented perpendicular to the first short elongated section 1210. The third transverse wall 1230 extends to a fifth curved portion 1234 at its end 1232 remote from the fourth curved portion. The third transverse wall has an interior surface 1229. The fifth curved portion 1234 extends to a second longitudinal retaining member or second longitudinal retaining wall 1240 which is aligned parallel to and spaced apart from the first longitudinal retaining wall 1026.

The second longitudinal retaining wall 1240 has a lower or exterior surface 1242 and an upper or interior surface 1244, and terminating in a second distal end 1246. The distal end 1024 of the first longitudinal retaining wall 1026 is aligned with the distal end 1246 of the second longitudinal retaining wall 1240.

The first short elongated section 1210 has a second threaded opening 1222 extending from a top or upper surface 1213 to its bottom or lower surface 1214. The upper surface 1213 of first short elongated section 1210 is aligned parallel to the lower surface 1023 longitudinal proximal section 1022 of the elongated section 1030 of the first main section 1020. The first opening 1040 in the longitudinal proximal section 1022 is aligned with the second threaded opening 1222 in the first short elongated section 1210. A mating threaded bolt 1290 is passed through the first opening 1040, through a central opening 1272 in a flexible expandable washer 1270 and through the second threaded opening 1222.

Referring to FIG. 4, a lower surface 1023 of first longitudinal retaining wall 1026 is parallel to the upper surface 1244 of the second longitudinal retaining wall 1240 with the two longitudinal retaining walls separated by a distance. With the flexible expandable washer 1270 removed, the mating threaded bolt 1290 is passed through the first threaded opening 1040 and through the second threaded opening 1222 as illustrated in FIG. 4 and the distance between the lower surface 1023 of first longitudinal retaining wall 1026 is parallel to the upper interior surface 1244 of the second longitudinal retaining wall 1240 is the minimum distance "D-MIN" (as illustrated in FIG. 4).

The individual components are best illustrated in the exploded view of FIG. 5. With the flexible expandable washer 1270 inserted and not compressed, the mating threaded bolt 1290 is passed through the opening 1040, through the central opening 1272 in a flexible expandable washer 1270 and through the second threaded opening 1222 as illustrated in FIG. 1 and the distance between the lower surface 1023 of first longitudinal retaining wall 1026 is parallel to the upper surface 1244 of the second longitudinal retaining wall 1240 is the maximum "D-MAX" when the flexible expendable washer is used. It is also within the spirit and scope of the present invention to include a multiplicity of flexible expandable washers with central openings stacked on top of each other with a mating bolt or fastening member utilized as just described to increase 'D-MAX".

With the flexible expandable washer 1270 inserted and compressed, the mating threaded bolt 1290 is passed through the first opening 1040, through the central opening 1272 in a flexible expandable washer 1270 and through the second threaded opening 1222 as illustrated in FIG. 2 and the distance between the lower surface 1023 of first longitudinal retaining wall 1026 is parallel to the upper surface 1244 of the second longitudinal retaining wall 1240 is the intermediate distance "D-INT" which varies depending on how much the flexible expandable washer is compressed.

Figure 6:
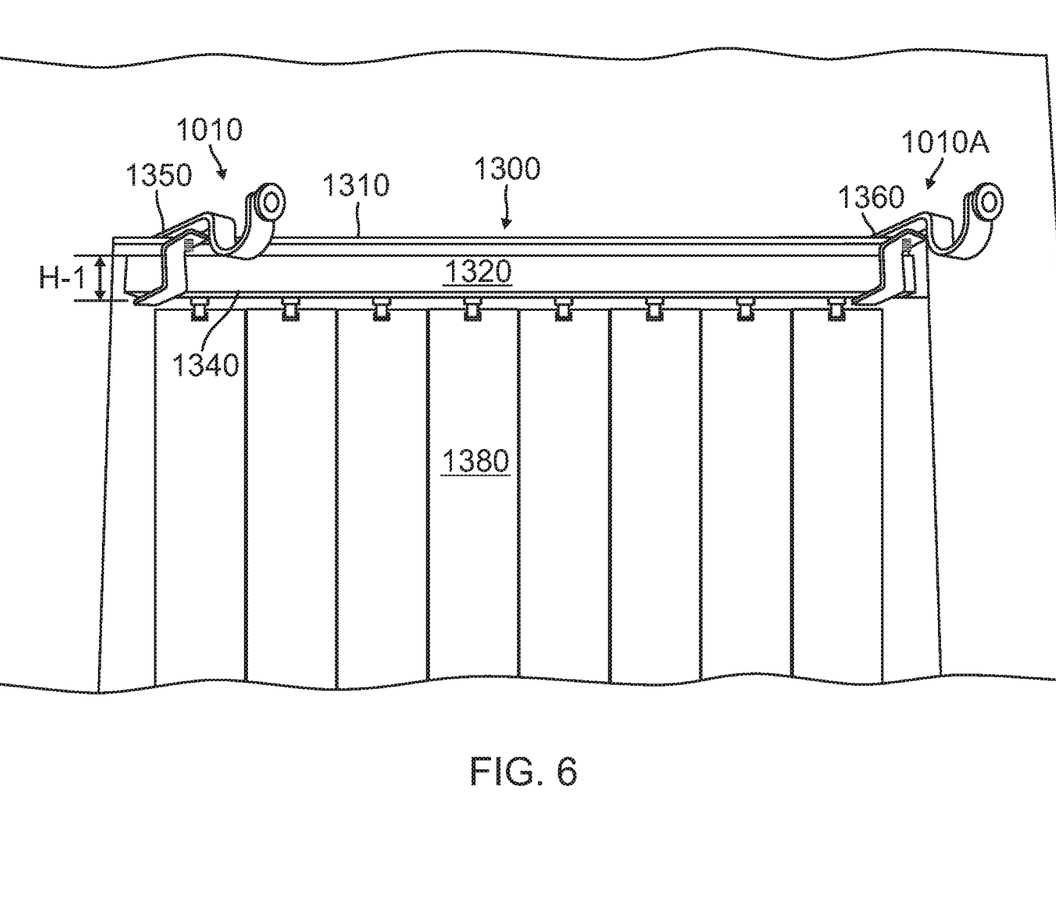
FIG. 6 is a front perspective view of a head rail with vertical blinds and a pair of spaced apart rod bracket attachment members attached at spaced apart locations on the head rail.

FIG. 6 is a front perspective view of a head rail 1300 with vertical blinds (or other window shades or covering) 1380 and a pair of spaced apart rod bracket attachment members 1010 and 1010A attached at spaced apart locations 1350 and 1360 on the head rail 1300.

Figure 7:
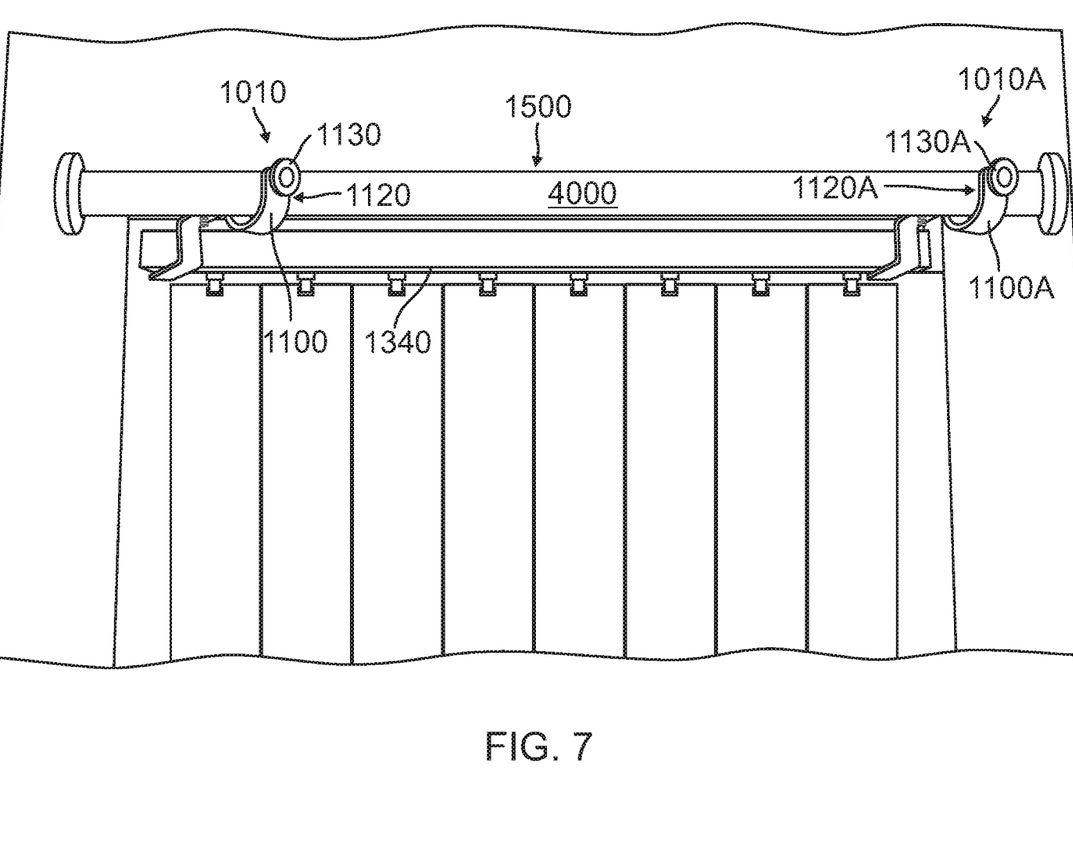
FIG. 7 is a front perspective view of a head rail with vertical blinds and a pair of spaced apart rod bracket attachment members attached at spaced apart locations on the head rail, with a curtain rod retained in the curtain rod retaining members of the rod bracket attachment members.

FIG. 7 is a front perspective view of a head rail 1300 with vertical blinds 1080 and a pair of spaced apart rod bracket attachment members 1010 and 1010A attached at spaced apart locations on the head rail 1300, with a curtain rod 4000 retained in the curtain rod retaining members 1100 and 1100A of the rod bracket attachment members 1010 and 1010A.

Referring to FIG. 6, in operation, the lower surface 1023 of the first longitudinal retaining wall 1026 is placed onto a portion of the top 1310 of the head rail 1300 so that the lower surface 1023 of the first longitudinal retaining wall 1026 rests on the top 1310 of the head rail 1300. The upper surface 1244 of the second longitudinal retaining wall 1240 rests against a portion of bottom 1340 of the head rail 1300 and interior surface 1229 of third transverse wall 1230 rests against front vertical wall 1320 of the head rail 1300. The threaded bolt 1290 is tightened to so that the lower surface 1023 of the first longitudinal retaining wall 1026 is press fit retained on the top 1310 of the head rail 1300 and the upper interior surface 1244 of the second longitudinal retaining wall 1240 is press fit retained against a portion of bottom 1340 of the head rail 1300. Depending on the height "H-1" of the front surface 1320 of the head rail, no flexible expandable washer 1270 is used or at least one flexible expandable washer is used and the threaded bolt 1290 is tightened in an appropriate amount to create the press fit. At least a portion of the interior surface 1229 of the third transverse wall 1230 rests against the front vertical wall 1320 of the head rail 1300. Therefore, the present invention curtain rod attachment member 1010 is adjustable to accommodate head rails of different heights. The curtain rod retaining section 1100 (and 1100A) extends in front of the head rail 1300.

Referring to FIG. 7, two such curtain rod bracket attachment members 1010 and 1010A are fastened at spaced apart locations 1350 and 1360 of the head rail 1300. A curtain rod 4000 is inserted into respective retaining sections 1100 and 1100A of respective parallel curtain rod bracket attachment members 1010 and 1010A and respective knobs 1130 and 1130A of a respective curtain rod retaining member 1120 and 1120A causes the interior end 1026 threaded bolt 1120 and/or an interior end 1026A of threaded 1120A (not shown) to be fastened against a portion of the curtain rod 4000 to prevent the curtain rod 4000 from sliding on the curtain rod attachment members 1010 and 1010A.

The invention curtain rod attachment members 1010 and 1010A are adjustable to conform to the height H-1 from top surface 1310 to bottom surface 1340 of a head rail 1300 of vertical venetian blinds 1380 or other vertical window shades or horizontal venetian shades or other horizontal window shades without requiring and structural modification to the head rail or any other portion of a wall of a room. The maximum distance between the lower surface 1023 of first longitudinal retaining wall 1026 and the upper surface 1244 second longitudinal retaining wall 1240 is between one and one-half (1½) inches and one (1) inch.

It is a further object of the present invention to provide at least a pair of spaced apart curtain attachment rod members 1010 and 1010A which are removably attached to the head rail 1300. The first main section 1020 and second main section 1200 of each curtain rod bracket attachment member 1010 and 1010A is made of material selected from the group consisting of metal and plastic.

Based on the above detailed description, other advantages of the present invention include inside mounted blinds curtain rod bracket 1010 and 1010A attachments which are specially engineered for blind attachment. In addition, the present invention facilitates inside mounted vertical rail blind attachments. The present invention is also adjustable to fit different head rail thicknesses.

Of course the present invention is not intended to be restricted to any particular form or arrangement, or any specific embodiment, or any specific use, disclosed herein, since the same may be modified in various particulars or relations without departing from the spirit or scope of the claimed invention here-in-above shown and described of which the apparatus or method shown is intended only for illustration and disclosure of an operative embodiment and not to show all of the various forms or modifications in which this invention might be embodied or operated.

What is claimed is:

1. A curtain rod bracket attachment member, comprising;
a. a first main section having an elongated section extending in a first horizontal direction to a first distal end, a first portion of the first main section is a first longitudinal retaining wall which terminates in the first distal end, a second portion of the elongated longitudinal section is an elongated proximal section having a distal end integrally extending from a proximal end of the first longitudinal retaining section and a proximal end extending to a first curved portion which extends to a first transverse wall having an exterior surface and an interior surface which extends to a semi-circular wall having an exterior surface and an interior surface which extends to a second transverse wall having an exterior surface and an interior surface ending in an upper arcuate top wall having an exterior surface and an interior surface;
b. the first curved portion, the first transverse wall, the semi-circular wall, the second transverse wall and the upper arcuate top wall are one integral unit forming a curtain rod retaining section which includes a partially open interior channel with the interior surface of the semi-circular wall and spaced apart interior surface of the first transverse wall and the interior surface of the second transverse wall, an opening between the first curved portion and the interior surface of the upper arcuate top wall extending to the bottom semi-circular section;
c. a curtain rod retaining member extends through a location between the second transverse wall and the upper arcuate top wall from respective exterior surfaces to respective interior surfaces, and includes a threaded opening within the second transverse wall and upper arcuate top wall aligned with the first curved portion with a threaded bolt extending through the threaded opening, an interior end of the threaded bolt extending into the partially open interior channel, and an exterior end of the threaded bolt ending in a circular knob;
d. said elongated section further includes an opening in the longitudinal proximal section extending from an upper surface of the longitudinal proximal section to the lower surface of the longitudinal proximal section;
e. a second main section having a first short elongated section extending to a second curved portion at one end and extending to a first end of a third transverse wall which is oriented perpendicular to the first short elongated section, the third transverse wall extending to a third curved portion at its second end remote from the second curved portion, the third curved portion extending to a second longitudinal retaining wall which is aligned parallel to and spaced apart from the first longitudinal retaining wall, the second longitudinal retaining wall having an exterior surface and an upper interior surface and terminating in a second distal end, the distal end of the first longitudinal retaining wall is aligned with the distal end of the second longitudinal retaining wall; and
f. said first short elongated section having a second threaded opening extending from an upper surface to its lower surface, the upper surface of the first short elongated section is aligned parallel to the lower surface of the longitudinal proximal section of the elongated section of the first main section, the first threaded opening in the longitudinal proximal section aligned with the second threaded opening in the first short longitudinal section, a mating threaded bolt threaded through the first threaded opening, through a central opening in a flexible expandable washer and threaded through the second threaded opening, the lower surface of the first longitudinal retaining wall and the upper interior surface of the second longitudinal retaining wall are separated by a distance, with the flexible expandable washer removed, the mating threaded bolt is threaded through the first threaded opening and threaded through the second threaded opening and the distance between the lower surface of the first longitudinal retaining wall and the upper interior surface of the second longitudinal retaining wall is a minimum distance, with at least one flexible expandable washer inserted and not compressed, the mating threaded bolt is threaded through the first threaded opening, through a respective opening in said at least one flexible expandable washer and threaded through the second opening, the distance between the lower surface of the first longitudinal retaining wall and the upper interior surface of the second longitudinal retaining wall is a maximum distance, and with said flexible expandable washer inserted and compressed, the mating threaded bolt is threaded through the first threaded opening, through said opening in said flexible expandable washer and threaded through the second opening, the distance between the lower surface of the first longitudinal retaining wall and the upper interior surface of the second longitudinal retaining wall is an intermediate distance which varies depending on how much the flexible expandable washer is compressed;
g. whereby, said curtain rod attachment section is adapted for use with a head rail of a window blind with the lower surface of the first longitudinal retaining wall placed onto a portion of a top surface of the head rail, the upper interior surface of the second longitudinal retaining wall is placed on a portion of a bottom surface of the head rail, and said mating threaded bolt is tightened until the interior surface of the first longitudinal retaining wall is press fit against a portion of the top surface of the head rail and the upper interior surface of the second longitudinal retaining wall is press fit against a portion of a bottom surface of the head rail;

h. a pair of curtain rod attachment bracket members are removably affixed at spaced apart locations on said head rail, with a respective curtain rod retaining section extending in front of the head rail and parallel to each other, a curtain rod is inserted into respective curtain rod retaining sections of respective parallel curtain rod bracket attachment members and the knob of each respective curtain rod retaining member causes a respective interior end of threaded bolt to be fastened against a portion of the curtain rod to prevent the curtain rod from sliding on the respective curtain rod retaining section of each respective curtain rod attachment bracket member.

2. A curtain rod bracket attachment member comprising:

a. a first main section having an elongated section extending in a first horizontal direction to a first distal end, a first portion of the first main section is a first longitudinal retaining wall which terminates in the first distal end, a second portion of the elongated longitudinal section is an elongated proximal section having a distal end integrally extending from a proximal end of the first longitudinal retaining section and a proximal end extending to a first curved portion which extends to a first transverse wall having an exterior surface and an interior surface which extends to a semi-circular wall having an exterior surface and an interior surface which extends to a second transverse wall having an exterior surface and an interior surface ending in an upper arcuate top wall having an exterior surface and an interior surface;

b. the first curved portion, the first transverse wall, the semi-circular wall, the second transverse wall and the upper arcuate top wall are one integral unit forming a curtain rod retaining section which includes a partially open interior channel with the interior surface of the semi-circular wall and spaced apart interior surface of the first transverse wall and the interior surface of the second transverse wall, an opening between the first curved portion and the interior surface of the upper arcuate top wall extending to the bottom semi-circular section;

c. a curtain rod retaining member extends through a location selected from a group consisting of between a second transverse wall and the upper arcuate top wall, the second transverse wall and the upper arcuate top wall from respective exterior surfaces to respective interior surfaces, and includes a threaded opening within said group consisting of between the second transverse wall and the upper arcuate top wall, the second transverse wall and the upper arcuate top wall with a threaded bolt extending through the threaded opening, an interior end of the threaded bolt extending into the partially open interior channel, and an exterior end of the threaded bolt ending in a knob;

d. said elongated section further includes a first opening in the longitudinal proximal section extending from an upper surface of the longitudinal proximal section to the lower surface of the longitudinal proximal section;

e. a second main section having a first short elongated section extending to a second curved portion at one end and extending to a first end of a third transverse wall which is oriented perpendicular to the first short elongated section, the third transverse wall extending to a third curved portion at its second end remote from the second curved portion, the third curved portion extending to a second longitudinal retaining wall which is aligned parallel to and spaced apart from the first longitudinal retaining wall, the second longitudinal retaining wall having an exterior surface and an upper interior surface and terminating in a second distal end, the distal end of the first longitudinal retaining wall is aligned with the distal end of the second longitudinal retaining wall; and f. said first short elongated section having a second threaded opening extending from an upper surface to its lower surface, the upper surface of the first short elongated section is aligned parallel to the lower surface of the longitudinal proximal section of the elongated section of the first main section, the first opening in the longitudinal proximal section aligned with the second threaded opening in the first short longitudinal section, a mating threaded bolt selected from the group consisting of extended through the first threaded opening, through a central opening in a flexible expandable washer and threaded through the second threaded opening and, threaded through the first threaded opening and threaded through the second threaded opening.

3. The curtain rod bracket attachment member, in accordance with claim 2, further comprising: said lower surface of the first longitudinal retaining wall and the upper interior surface of the second longitudinal retaining wall are separated by a distance.

4. The curtain rod bracket attachment member, in accordance with claim 3 further comprising: with the flexible expandable washer removed, the mating threaded bolt is extended through the first opening and threaded through the second threaded opening and the distance between the lower surface of the first longitudinal retaining wall and the upper interior surface of the second longitudinal retaining wall is a minimum distance.

5. The curtain rod bracket attachment member, in accordance with claim 3 further comprising: with at least one flexible expandable washer inserted and not compressed, the mating bolt is extended through the first opening, through a respective opening in said at least one flexible expandable washer and threaded through the second opening, the distance between the lower surface of the first longitudinal retaining wall and the upper interior surface of the second longitudinal retaining wall is a maximum distance.

6. The curtain rod bracket attachment member, in accordance with claim 3, further comprising: with said flexible expandable washer inserted and not compressed, the mating threaded bolt is extended through the first opening, through said opening in said flexible expandable washer and threaded through the second opening, the distance between the lower surface of the first longitudinal retaining wall and the upper interior surface of the second longitudinal retaining wall is an intermediate distance which varies depending on how much the flexible expandable washer is compressed.

7. The curtain rod bracket attachment member, in accordance with claim 3, further comprising: said curtain rod attachment section is adapted for use with a head rail of a window shading member with the lower surface of the first longitudinal retaining wall placed onto a portion of a top surface of the head rail, the upper interior surface of the second longitudinal retaining wall is placed on a portion of a bottom surface of the head rail, and said mating threaded bolt is tightened until the interior surface of the first longitudinal retaining wall is press fit against a portion of the top surface of the head rail and the upper interior surface of the second longitudinal retaining wall is press fit against a portion of a bottom surface of the head rail.

8. The curtain rod bracket attachment member in accordance with claim 7, further comprising: a pair of curtain rod attachment bracket members are removably affixed at spaced apart locations on said head rail, with a respective curtain rod retaining section extending in front of the head rail and parallel to each other, a curtain rod is inserted into respective curtain rod retaining sections of respective parallel curtain rod bracket attachment members and the knob of each respective curtain rod retaining member causes a respective interior end of threaded bolt to be fastened against a portion of the curtain rod to prevent the curtain rod from sliding on the respective curtain rod retaining section of each respective curtain rod attachment bracket member.

9. The curtain rod bracket attachment member in accordance with claim 3, further comprising: the distance between the interior surface of first longitudinal retaining wall and the upper interior surface of the second longitudinal retaining wall on each respective curtain rod bracket attachment member is between one (1) inch and one and a half (1½) inch.

10. The curtain rod bracket attachment member, in accordance with claim 2, further comprising: said curtain rod bracket attachment member is made out of materials selected from a group consisting of metal and plastic.

11. The curtain rod bracket attachment member, in accordance with claim 2, further comprising: said curtain rod bracket attachment member is removably affixed to said head rail without requiring screwing any portion of the curtain rod bracket attachment member to any portion of said head rail.

12. The curtain rod bracket attachment member, in accordance with claim 2, further comprising: said curtain rod bracket attachment member is removably affixed to said head rail without requiring any drilling or hammering on the curtain rod attachment member or the head rail.

13. A curtain rod bracket attachment member comprising:
   a. a first main section having an elongated section extending in a first horizontal direction to a first distal end, a first portion of the first main section is a first longitudinal retaining wall which terminates in the first distal end, a second portion of the elongated longitudinal section is an elongated proximal section having a distal end integrally extending from a proximal end of the first longitudinal retaining section and a proximal end extending to a curtain rod retaining section;
   b. said elongated section further includes a first opening in the longitudinal proximal section extending from an upper surface of the longitudinal proximal section to the lower surface of the longitudinal proximal section;
   e. a second main section having a first short elongated section extending to a first end of a transverse wall which is oriented perpendicular to the first short elongated section, the transverse wall extending at a second end to a second longitudinal retaining wall which is aligned parallel to and spaced apart from the first longitudinal retaining wall, the second longitudinal retaining wall having at least an upper interior surface and terminating in a second distal end; and
   d. said first short elongated section having a second fastening opening extending from an upper surface to its lower surface, the upper surface of the first short elongated section is aligned parallel to the lower surface of the of longitudinal proximal section of the elongated section of the first main section, the first opening in the longitudinal proximal section aligned with the second fastening opening in the first short longitudinal section, a mating fastening member selected from a group consisting of extended through the first opening, through a central opening in a flexible expandable washer and fastened through the second fastening opening.

14. The curtain rod bracket attachment member in accordance with claim 13; said curtain rod retaining section further comprising:
   a. said proximal end of said proximal section extending to a first curved portion which extends to a first transverse wall having at least an interior surface which extends to a semi-circular wall having at least an interior surface which extends to a second transverse wall having an exterior surface and an interior surface partially surrounding an interior chamber having an opening; and
   b. a curtain rod retaining member.

15. The curtain rod bracket attachment member, in accordance with claim 13, further comprising: said curtain rod attachment section is adapted for use with a head rail of a window shade member with the lower surface of the first longitudinal retaining wall placed onto a portion of a top surface of the head rail, the upper interior surface of the second longitudinal retaining wall is placed on a portion of a bottom surface of the head rail, and said mating fastening member is tightened until the interior surface of the first longitudinal retaining wall is press fit against a portion of the top surface of the head rail and the upper interior surface of the second longitudinal retaining wall is press fit against a portion of a bottom surface of the head rail.

16. The curtain rod bracket attachment member in accordance with claim 13, further comprising: a pair of curtain rod attachment bracket members are removably affixed at spaced apart locations on said head rail, with a respective curtain rod retaining section extending in front of the head rail and parallel to each other, a curtain rod is inserted into respective curtain rod retaining section of each respective parallel curtain rod bracket attachment members and a curtain rod retaining member is fastened against a portion of the curtain rod to prevent the curtain rod from sliding on the respective curtain rod retaining section of each respective curtain rod attachment bracket member.

17. The curtain rod bracket attachment member in accordance with claim 13, further comprising:
   a. said first longitudinal retaining wall having a lower surface and is parallel to and spaced apart from and separated by a distance from said second longitudinal retaining wall and its upper interior surface; and
   b. said distal end of said first longitudinal retaining wall is aligned with said distal end of said second longitudinal retaining wall.

18. The curtain rod bracket attachment member, in accordance with claim 17 further comprising: the mating fastening member is extended through the first opening and threaded through the second threaded opening and the distance between the lower surface of the first longitudinal retaining wall and the upper interior surface of the second longitudinal retaining wall is a minimum distance.

19. The curtain rod bracket attachment member, in accordance with claim 17 further comprising: at least one flexible expandable washer with a central opening between the lower surface of said proximal section and the upper surface of the first short elongated section, the at least one flexible expandable washer not compressed, the mating fastening member extended through said first opening, through a respective opening in said at least one flexible expandable washer and threaded through the second opening, the distance between the lower surface of the first longitudinal retaining wall and the upper interior surface of the second longitudinal retaining wall is a maximum distance.

20. The curtain rod bracket attachment member, in accordance with claim 17, further comprising: a flexible expandable washer with a central opening between the lower surface of said proximal section and the upper surface of the first short elongated section with said flexible expandable washer compressed, the mating fastening member is extended through the first threaded opening, through said opening in said flexible expandable washer and threaded through the second threaded opening, the distance between the lower surface of the first longitudinal retaining wall and the upper interior surface of the second longitudinal retaining wall is an intermediate distance which varies depending on how much the flexible expandable washer is compressed.

\* \* \* \* \*